June 28, 1955  F. E. RHINE  2,711,936
BOGIE WHEEL OR ROLLER FOR CRAWLER TYPE MACHINES
Filed Feb. 4, 1952  2 Sheets-Sheet 1
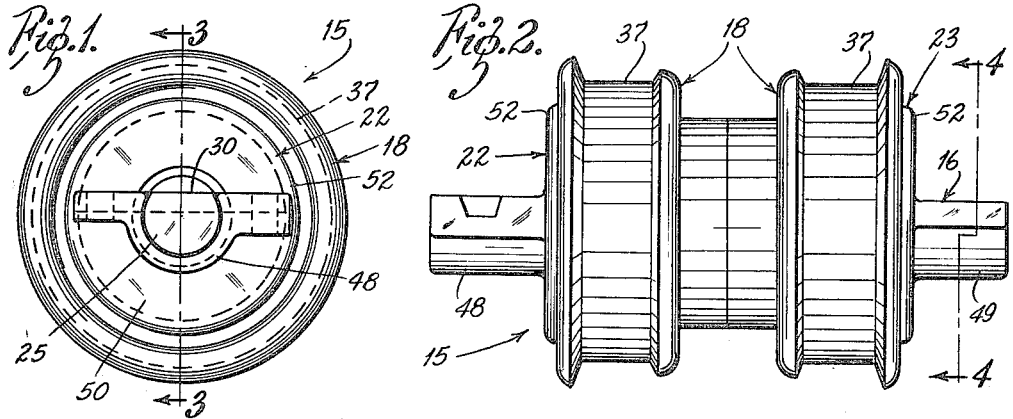
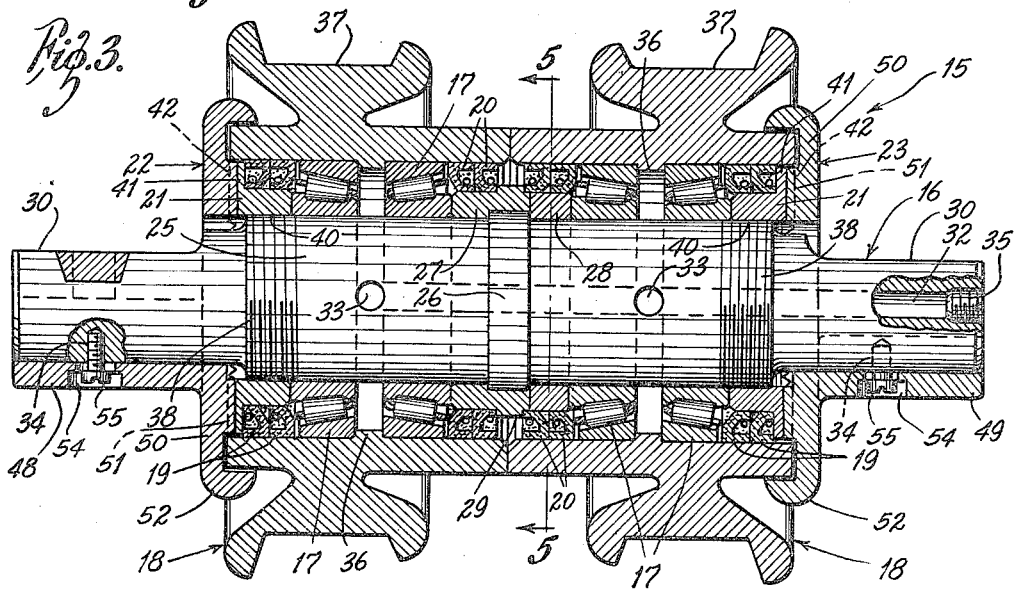
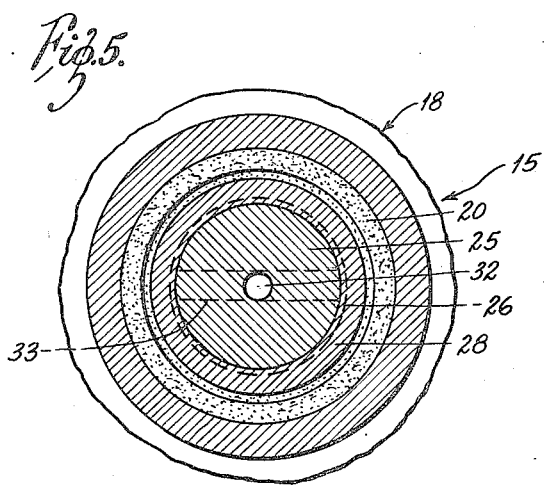
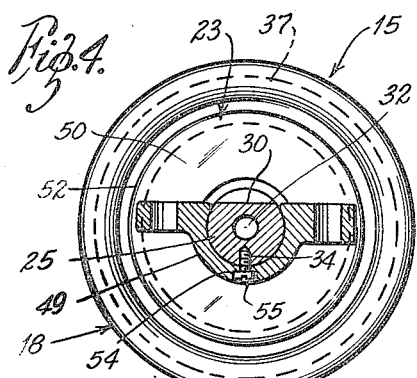
INVENTOR:
FRANKLIN E. RHINE,
BY Kingsland, Rogers & Ezell
ATTORNEYS

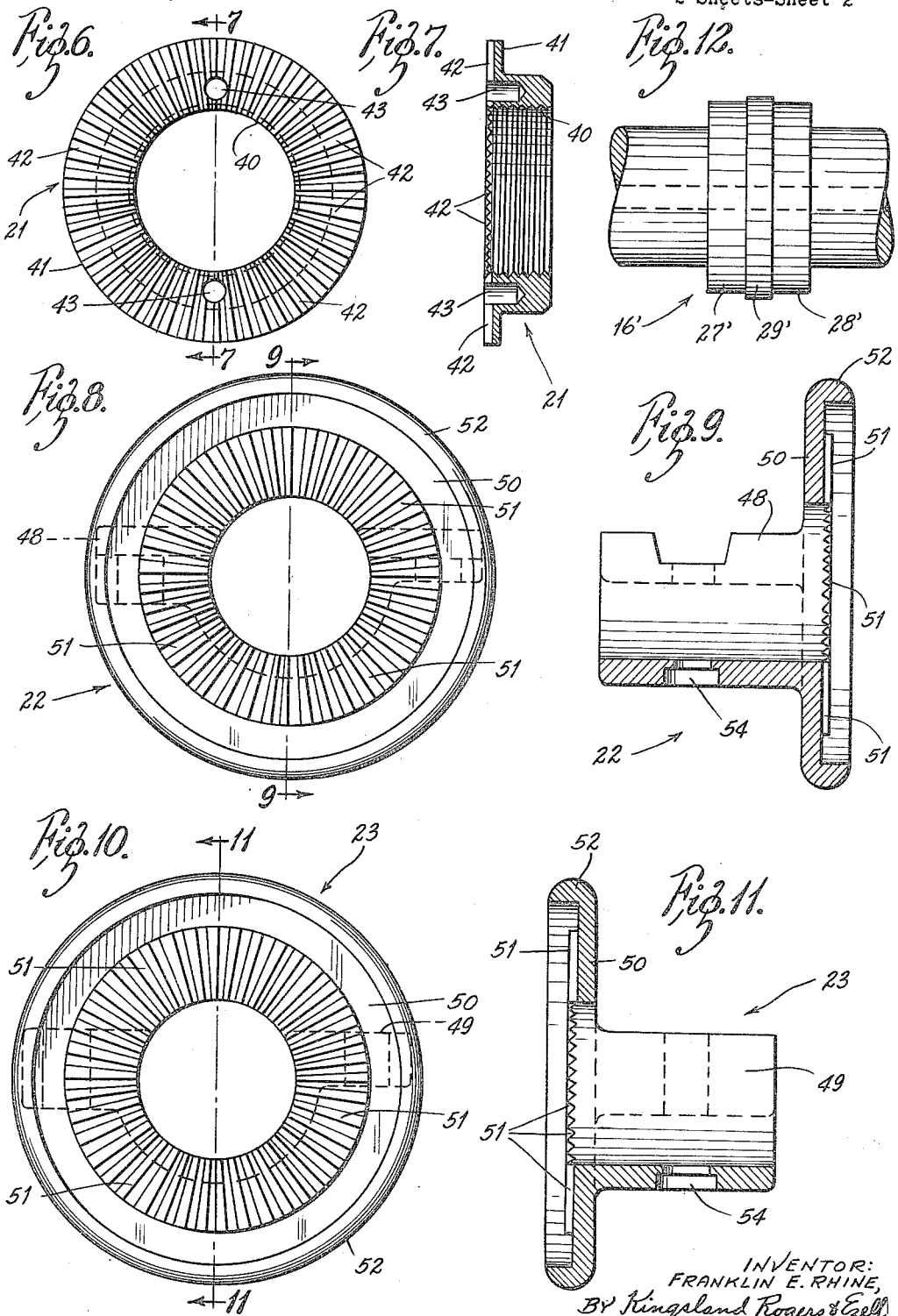

United States Patent Office 2,711,936
Patented June 28, 1955

2,711,936

BOGIE WHEEL OR ROLLER FOR CRAWLER TYPE MACHINES

Franklin E. Rhine, Alton, Ill., assignor to Sterling Steel Casting Co., Monsanto, Ill., a corporation of Illinois Application February 4, 1952, Serial No. 269,751

7 Claims. (Cl. 308—187)

The present invention relates generally to crawler type machines, and more particularly to an improved bogie wheel or roller unit for crawler type machines, such as tractors.

There has long existed the need for a bogie wheel or roller unit for a crawler type machine, such as a tractor, which will stand up under the terrific strain to which such devices are subjected. Tractors and other crawler type machines must move through mud, sand, marshy ground, and the like, so that the bogie wheel or roller units are subjected to mud, sand, water, and the like. Up until the present invention, in the applicant's wide experience, no one has been able to construct a bogie wheel or roller unit which will withstand the entry of foreign matter, such as mentioned, for more than a very few hours. Additionally, lubrication has constantly been a problem in respect to bogie wheel or roller units, it normally being necessary to lubricate these units many times during a day's use of the machine of which they form parts. From faulty lubrication and the entrance internally of foreign matter, bogie wheel or roller units freeze, thereby becoming, in effect, skid shoes which, in each instance, wear out the particular bogie wheel or roller in one spot, at the same time wearing out the tractor chains. Down time is a serious factor in the use of tractors, and the like, a large percentage of which is due to the failure of the bogie wheel or roller units. Lubrication-wise, the same problem has long existed in respect to other machines employing bogie wheel or roller units.

Briefly, the present novel bogie wheel or roller unit includes a novel axle which supports a plurality of roller bearings, which, in turn, support a pair of adjacent or abutting wheels or rollers. Flanged and radially grooved locking nuts threadedly engage the ends of the shaft which are adjustable inwardly to selected positions for maintaining the bearings in selected positions, a plurality of seals being provided internally at each locking nut and at the point of contact of the two wheels or rollers. Radially grooved locking cap and bracket members engage the radially grooved surfaces of the locking nuts, and are secured firmly to the axle by cap screws, the bracket portions being formed for securely mounting the bogie wheel or roller unit upon a tractor frame or other support.

Therefore, an object of the present invention is to provide a novel bogie wheel or roller unit of improved construction which overcomes the deficiencies existing in presently used units.

Another object is to provide a novel bogie wheel or roller unit which will operate for an extended period of time without the addition of lubrication to that supplied initially.

Another object is to provide a novel bogie wheel or roller unit incorporating a novel axle construction and novel locking nut and end cap-bracket construction which contribute to the durability and efficiency of the unit.

Another object is to provide a novel bogie wheel or roller unit which may be initially adjusted in respect to the bearings which will remain as adjusted during handling and after permanent installation upon a tractor or other machine.

Another object is to provide a novel bogie wheel or roller unit which is sealed against the escape of lubricant and against the entry of destructive foreign matter, and which remains thus sealed during extensive use so that the wheels or rollers continue to rotate and perform their expected functions.

Another object is to provide a novel bogie wheel or roller unit which incorporates individually movable bogie wheels or rollers contiguously disposed and sealed against the entry of destructive foreign matter at the point of engagement, so that each bogie wheel or roller functions independently, and one will continue to serve in its rotating capacity even should the other one freeze or otherwise become unserviceable.

Another object is to provide a novel bogie wheel or roller unit which is exceptionally serviceable even under the roughest usage, which may be readily installed upon a tractor frame or other support, which may be readily manufactured at reasonable cost, and which finds wide adaptation.

The foregoing and other objects and advantages are apparent from the following description taken with the accompanying drawings, in which:

Fig. 1 is an end elevational view of a bogie wheel or roller unit incorporating the teachings of the present invention;

Fig. 2 is a side elevational view thereof;

Fig. 3 is an enlarged vertical, longitudinal cross-sectional view taken on substantially the line 3—3 of Fig. 1;

Fig. 4 is a vertical, transverse cross-sectional view taken on substantially the line 4—4 of Fig. 2;

Fig. 5 is a vertical, transverse cross-sectional view taken on substantially the line 5—5 of Fig. 3;

Fig. 6 is an end elevational view of the novel locking nut forming part of the unit;

Fig. 7 is a cross-sectional view taken on substantially the line 7—7 of Fig. 6;

Fig. 8 is an end elevational view of one end cap and bracket member which engages a locking nut of Fig. 6;

Fig. 9 is a cross-sectional view taken on substantially the line 9—9 of Fig. 8;

Fig. 10 is an end elevational view of the other end cap and bracket member;

Fig. 11 is a cross-sectional view taken on substantially the line 11—11 of Fig. 10; and Fig. 12 is a fragmentary view of the central portion of a modified axle construction.

Referring to the drawings more particularly by reference numerals, 15 indicates generally a bogie wheel or roller unit incorporating the concepts of the present invention. Broadly, the unit 15 includes an axle construction 16, four roller bearing assemblies 17 which may be Timken bearings, two bogie wheels or rollers 18 supported on the bearings 17, two pairs of outwardly disposed sealing members 19, and two pairs of inwardly directed sealing members 20, all four preferably of the Johns-Manville lip-seal type, a locking nut 21 threadedly engaging each end of the axle construction 16, and end cap and bracket members 22 and 23 engaging the locking nuts 21 to maintain them in adjusted position.

The novel axle construction 16 is clearly shown in Figs. 1 through 5 and includes a machined main shaft 25 having a centrally located annular ridge 26. Abutting tube segments 27 and 28 of the cross sections shown are press-fitted onto the shaft 25 in abutting relation with the ridge 26 which is also clearly shown in Fig. 3. The segment 27 has an annular ridge 29. At each end the main shaft 25 is reduced in diameter and is cut away to form a flattened surface 30 for mounting purposes, as appears below. A longitudinal or axial lubrication well 32 closed by a removable plug 35 is drilled into the main shaft 25 which is intercepted by radial wells 33 for introducing lubrication to the bearing assemblies 17. Each reduced extremity of main shaft 25 has a threaded well 34 for the reception of a cap screw more particularly described below.

The four roller bearing assemblies 17 are disposed on the main shaft 25 of the axle construction 16 in spaced relation as is clearly shown in Fig. 3. Preferably, the assemblies 17 are Timken bearings, although equivalent assemblies may be employed. Each pair of assemblies 17 supports one of the bogie wheels or rollers 18, each of the latter including an internal annular ridge 36 separating and spacing the associated pair of roller bearing assemblies 17. Each bogie wheel or roller 18 has an annular peripheral channel 37 for receiving the usual interior portion of the chain or tread of a tractor or the chain of any other machine with which the unit 15 may be operatively associated.

The locking nuts 21 threadedly engage threaded end portions 38 of the main shaft 25 inwardly of the reduced portions, each being of the configuration clearly shown in Figs. 6 and 7, and including internal threads 40, an annular radial flange 41 having radial grooves 42 of V-cross section on one face, and diametrically spaced tool-prong receiving wells 43. Each locking nut 21 is adjusted inwardly into substantial engagement with the adjacent roller bearing assembly 17 so that there is substantially no play between the several elements of the unit 15. The two pairs of sealing members 19 are disposed about the locking nuts 21, as illustrated in Fig. 3, with the lips facing outwardly. As mentioned, these sealing members 19 may be Johns-Manville seals of the lip type. It is to be noted that the two pairs of sealing members 20 are disposed about the tube segments 27 and 28 in a manner effectively preventing leakage, outwardly or inwardly, at the juncture of the two bogie wheels or rollers 18.

The two end cap and bracket members 22 and 23 are shown in detail in Figs. 8 through 11, which differ only in the specific configurations of the bracket portions 48 and 49, respectively. Each member 22 and 23 includes a radial flange portion 50 having radial grooves 51 of V-cross section on one face corresponding to the grooves 42 on the flanges 41 of the locking nuts 21, and an annular dust cap flange portion 52. Each bracket portion 48 and 49 is of semi-sleeve form, as illustrated in Figs. 1 and 4, respectively, being a little greater than half a circle in order to hold the reduced ends of the main shaft 25 against removal. Each bracket portion 48 and 49 includes an axial slot 54 of inset type which receives tap screws 55 when the members 22 and 23 are slipped onto the ends of the main shaft 25 (Fig. 3). It is to be noted from Fig. 3 that the members 22 and 23 close the ends of the unit 15 and rigidly engage the grooved faces of the locking nuts 21, thereby maintaining the internal elements of the unit 15 in the initially adjusted positions and insuring functioning thereof when the unit is mounted for operation. The tap screws 55 are inserted and securely tightened after engagement of the members 22 and 23 with the locking nuts 21 as aforesaid.

The unit 15 assembled as described and shown is mounted upon the supports of a tractor, or other machine, through the medium of the bracket portions 48 and 49 of the members 22 and 23. No modification of standard tractors is required. Once the unit 15 is anchored in operative position as part of a tractor, or other machine, the tap screws 55 may be removed if desired, since the relationship of the anchored members 22 and 23, the locking nuts 21 in inter-engagement therewith, and the axle construction 16 will remain fixed, as is obvious. However, the tap screws 55 are countersunk as shown so as to be out of the way and can well be left in position.

It is manifest that the unit 15 will require only occasional replacement of the lubrication, since the sealing members 19 and 20 and the closure cap 35 will effectively prevent that leakage which exists in bogie wheel or roller constructions in use today. The bogie wheels or rollers 18 are independently rotatable and will function for hundreds of hours of service. In respect to lubrication, experimental units have demonstrated that the unit 15 requires lubrication no oftener than every fifteen hundred hours of operation. It is a simple matter to inject additional grease by means of the well 32 after removal of the plug 35.

Should it be necessary to replace a part of the present unit 15, which may occur after long usage or through some inadvertence, it is a simple matter to dismantle the unit 15 and replace a bearing assembly 17, a sealing member 19 or 20, or any other element. The ease with which the unit 15 may be dismantled reduces maintenance costs to a minimum and increases the average over-all life.

In Fig. 12 there is shown a modified axle construction 16' which differs from the axle construction 16 only in substitution of annular integral ridges 27', 28' and 29' for the tube segments 27 and 28 and the annular ridge 29 of the tube segment 27.

It is apparent that there has been provided a bogie wheel or roller unit which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In a device of the kind described, in combination, a shaft, bearing members supported on said shaft, rollers supported on said bearing members in adjacent relationship, a locking member adjustably mounted on said shaft at each end of said rollers forming with said rollers a casing, sealing members interiorly of said rollers disposed against said locking members and at the point of contact of said rollers substantially preventing escape of lubrication and entry of foreign matter, an end cap and bracket member grippingly engaging each locking member, and means securing each end cap and bracket member to said shaft to maintain said locking members in adjusted positions.

2. In a device of the kind described, in combination, an axle construction comprising a main shaft and abutting tube segments secured thereon centrally thereof, one tube segment including an annular ridge, bearing members on said main shaft, there being a bearing member disposed against each tube segment in abutting relation, rollers mounted on said bearing members in abutting relation with the plane of abutment running through said annular ridge of said tube segment, and sealing members disposed about said tube segments and sealing off the bearing members from the juncture of the rollers preventing grease loss and entry of foreign matter to the bearing members.

3. In a device of the kind described, in combination, a shaft, spaced bearing members on said shaft, rollers supported on said bearing members, portions of said shaft, bearing members, and rollers being in lateral thrust engagement, sealing members between said rollers and shaft, a locking nut threaded on each end of said shaft maintaining said bearing members and rollers against movement along said shaft, each locking nut including a radial flange engaged by at least one of said sealing means, each of said radial flanges having radial grooves in the outer face, a member having similar radial grooves engaging each grooved radial flange, and releasable means securing said last members in engagement with said radial flanges and against movement relative to said shaft.

4. In a device of the kind described, in combination, a shaft, spaced bearing members on said shaft, rollers supported on said bearing members, portions of said shaft, bearing members, and rollers being in lateral thrust engagement, sealing members between said rollers and shaft, a locking nut threaded on each end of said shaft maintaining said bearing members and rollers against movement along said shaft, each locking nut including a radial flange engaged by at least one of said sealing means, each of said radial flanges having radial grooves in the outer face, an end cap and bracket member receiving each end of said shaft and engaging the grooved radial flanges of the adjacent locking nut, and releasable means securing said end cap and bracket members to said shaft.

5. In a device of the kind described, in combination, a shaft, spaced bearing members on said shaft, rollers supported on said bearing members, portions of said shaft, bearing members, and rollers being in lateral thrust engagement, sealing members between said rollers and shaft, a locking nut threaded on each end of said shaft maintaining said bearing members and rollers against movement along said shaft, each locking nut including a radial flange engaged by at least one of said sealing means, a bracket member lockingly engaging each of said locking nuts, and releasable means securing each of said bracket members to said shaft.

6. In a device of the kind described, in combination, a shaft, spaced bearing members on said shaft, rollers supported on said bearing members, portions of said shaft, bearing members, and rollers being in lateral thrust engagement, sealing members between said rollers and shaft, a locking nut threaded on each end of said shaft maintaining said bearing members and rollers against movement along said shaft, each locking nut including a radial flange engaged by at least one of said sealing means, a bracket member lockingly engaging each of said locking nuts, said bracket members receiving the ends of the shaft and comprising the means for mounting said device upon a support for operative use.

7. In a device of the kind described, in combination, a shaft, spaced bearing members mounted on said shaft, a pair of rollers supported on said bearing members in abutting relation, said rollers being independently rotatable, a locking member adjustably mounted on said shaft at each free end of said rollers forming with said rollers a casing, sealing members interiorly of each roller disposed against each locking member, and sealing members interiorly of each roller adjacent the plane of abutment thereof, said sealing members substantially preventing escape of lubrication and entry of foreign matter, said sealing members interiorly of each roller forming with the roller, shaft portion and locking member a lubrication chamber, said lubrication chambers being independent of each other thereby permitting continued performance of one roller should the other freeze.

References Cited in the file of this patent

UNITED STATES PATENTS

| | | |
|---|---|---|
| 1,574,799 | Dierks | Mar. 2, 1926 |
| 1,982,729 | Eberhard | Dec. 4, 1934 |
| 2,459,290 | Rozner | Jan. 18, 1949 |

FOREIGN PATENTS

| | | |
|---|---|---|
| 137,163 | Great Britain | Jan. 8, 1920 |